Jan. 25, 1944. L. C. BARNES 2,339,758
RECORDING WEIGHING SCALE
Filed Feb. 2, 1938 5 Sheets-Sheet 1

INVENTOR
LEWIS C. BARNES
BY
Orton and Griswold
ATTORNEYS

Jan. 25, 1944.	L. C. BARNES	2,339,758
RECORDING WEIGHING SCALE
Filed Feb. 2, 1938	5 Sheets-Sheet 2

INVENTOR
LEWIS C. BARNES
BY
ATTORNEYS

Jan. 25, 1944.   L. C. BARNES   2,339,758
RECORDING WEIGHING SCALE
Filed Feb. 2, 1938   5 Sheets-Sheet 3

INVENTOR
LEWIS C. BARNES
BY
Axton and Griswold
ATTORNEYS

FIG.8.

Jan. 25, 1944.  L. C. BARNES  2,339,758
RECORDING WEIGHING SCALE
Filed Feb. 2, 1938  5 Sheets-Sheet 5

INVENTOR
LEWIS C. BARNES
BY Aston and Griswold
ATTORNEYS

Patented Jan. 25, 1944

2,339,758

UNITED STATES PATENT OFFICE 2,339,758

RECORDING WEIGHING SCALE

Lewis C. Barnes, Rutland, Vt., assignor to The Howe Scale Company, Rutland, Vt., a corporation of Vermont Application February 2, 1938, Serial No. 188,251

15 Claims. (Cl. 234—5.4)

This invention relates to weighing scales of the kind in which the weight of a load on the scale is printed or otherwise depicted on a card or the like. More particularly, the invention relates to instrumentalities, the operation of which is controlled by movements of parts of the scale mechanism, which effect the recording of the weight.

One object of the invention is to avoid additional friction on or the placing of a strain upon the delicate scale mechanism in the operation of printing. Accordingly, the operation of the printer is independent of the weighing mechanism. A member such as a chart having relatively light transmitting and relatively opaque portions is movable proportionally to the scale beam. Such a chart is disclosed broadly in Letters Patent of the United States No. 1,357,731 dated November 2, 1920. The chart, conveniently, has relatively light transmitting and relatively opaque portions arranged in definite patterns bearing a direct relation to loads which the scale is capable of weighing. Movable in parallel paths upon opposite sides of the chart are a light responsive switching device and a source of light so that when a beam of light, passing through light transmitting portions, falls upon the light responsive device, electrical devices are energized to effect printing of indicia representing the weight corresponding to the location of the light transmitting areas and the load on the scale. The movement of the light responsive device is effected by power from a source independent of the scale mechanism, whereby no load is placed upon the scale. The chart and the instrumentalities effecting movement of the light responsive device are shown, described and claimed in a copending application of Lewis C. Barnes and Raymond B. Holt, Serial No. 183,630.

Another object of the present invention is to effect movement of the instrumentalities effecting printing in synchronism with the movements of the light responsive device. According to this aspect of the invention, power means is provided which simultaneously advances the light responsive means and a member with which the printing devices are carried.

It is also an object of the invention to bring the printing instrumentalities to printing position to print a number of two or more significant figures representing the weight of the load on the scale. In carrying this aspect of the invention into effect, printing numerals arranged from one to nine are arranged in parallel rows, one row for each significant figure of the maximum load the scale is capable of weighing, the rows being disposed in echelon preferably bearing a relation to the disposition of the light transmitting portions of the chart.

The invention seeks to print a zero when the light ray fails to pass through a light transmitting portion of the chart.

These and other objects of the invention and the means for their attainment will be more apparent from the following detailed description taken in connection with the accompanying drawings illustrating one embodiment by which the invention may be realized, and in which.

Figures 1, 2:
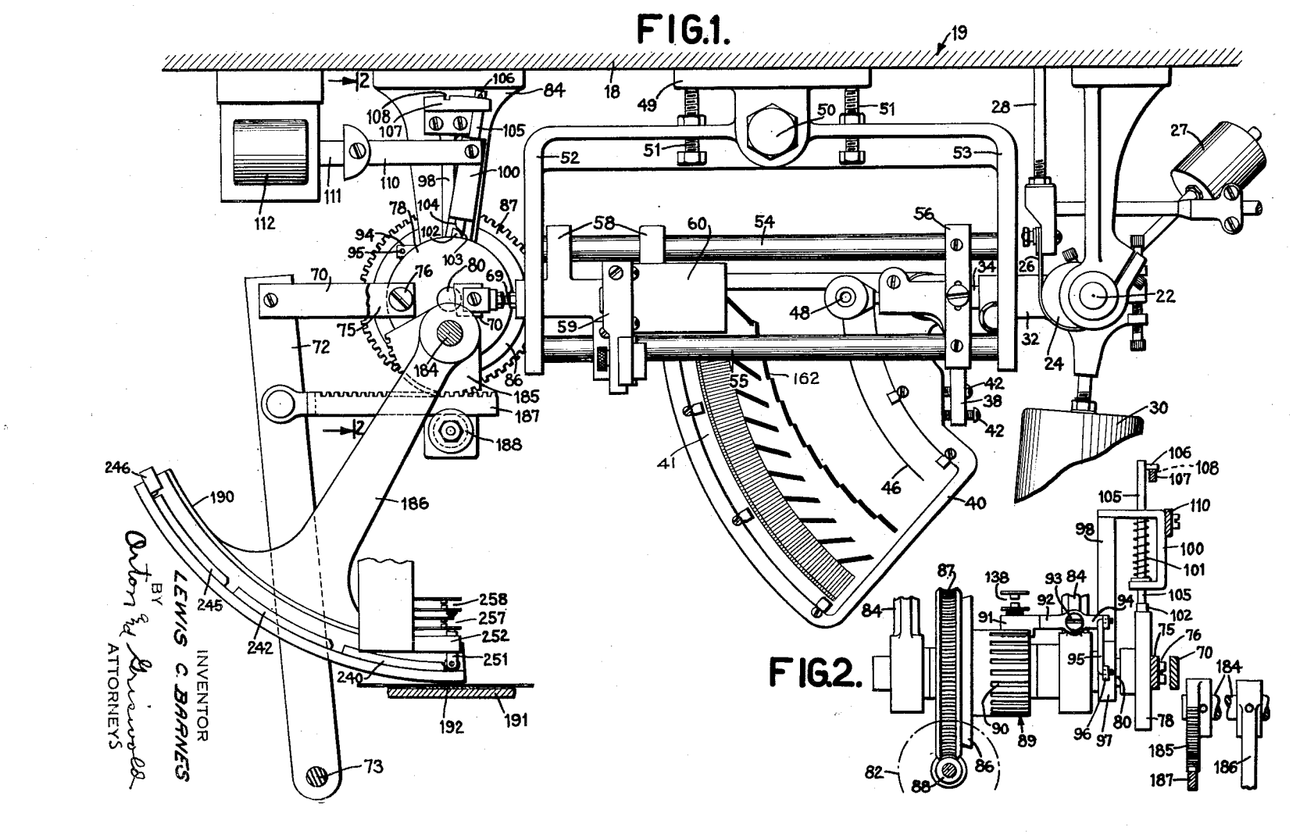
Figure 1 is a view in front elevation showing parts of a weighing scale to which the invention is applied and particularly the chart scanning mechanism and associated parts.
Figure 2 is a transverse sectional view of details of construction taken in the plane indicated by the line 2—2 of Figure 1 and looking in the direction of the arrows.

Referring first to Figure 1, the shaft 22 carries a cam 24, connected by a flexible tape 26 to the steel yard rod 28 of the weighing scale whereby, for each motion of the beam, a corresponding motion of the cam 24, and consequently of the shaft 22, is had. The shaft 22 carries a counterweight 27 and a pendulum 30. Extending outwardly, in a generally horizontal direction (as viewed and when no load is on the weighing scale) from the shaft 22, is an arm 32 on which is adjustably mounted an adjusting bracket 34, 38, having a downwardly extending portion. On the bracket 34 and at the left hand end thereof, as viewed, is mounted a frame member 40 carrying a chart 41. Frame 40 is pivoted to the portion 34 and is adjustable with respect to that portion, as by the set screws 42 in the downwardly extending portion 38 which bear against frame member 40, whereby the indicia depicted on the chart 41, carried by the frame 40, may be adjusted to proper position so that the graduated scale 46 thereon is, at all points, on exactly the same radius from the axis of the shaft 22. That is, so that all graduations of the graduated scale 46 are at exactly the same distance from the center of the shaft 22. Within the broken line circle the graduated scale is shown enlarged although in proportion to the chart and transparent areas, it is too small for illustration except as the line 46. It will thus be seen that as the shaft 22 is rocked in a clockwise direction when a load is on the weighing scale, that the chart 41 swings upwardly in a clockwise direction bringing the graduations and numerical indications thereof on the scale 46 past a fixed lens 48 which projects the reading on a viewing screen. Depending from the supporting surface or frame member 18, which may be the top of a casing 19, is a bracket 49 on which is adjustably pivoted, at 50, as by set screws 51, a frame having two depending parallel arms 52, 53 between which extends a pair of spaced horizontal bearings or guide rods 54 and 55. By means of the set screws 51, the frame is adjusted so that the various mechanisms carried by the rods 54, 55 may be moved or be positioned in a true horizontal plane, relatively speaking, to coincide with horizontal indicia (lines, etc.) on the chart 41. As shown, the projecting lens 48 is adjustably mounted, as by a frame member 56, on these rods 54 and 55.

A traveller or carriage 58 is slidably supported on the rods 54 and 55. A forwardly extending bracket 59 thereon adjustably carries a housing 60 containing a source of light 63 (Figure 8) and an optical system 61 adapted to project a beam of light on the chart 41 and through a registering light transmitting portion thereof upon a light responsive switch device, such as a photoelectric cell 64, Figure 8, which is contained within a housing, not shown, and adjustably carried on a bracket extending rearwardly from and also mounted on the carriage 58. The cross-sectional shape of this beam of light corresponds to the cross-sectional shape of the smallest aperture or light transmitting portion of the chart 41.

The carriage is adjustably and pivotally connected, as at 69, to a link or connecting rod 70 connected to the upper end of a vertically extending lever arm 72 pivoted, as at 73, on the frame of the machine, the lever 72 moving about its pivot in the plane of movement of the carriage 58. Lever 72 may be utilized to actuate any suitable form of printing mechanism to print a permanent record of the weight of the load on the scale.

The carriage 58 being motor propelled and being without mechanical connection with the delicate scale mechanism, may be utilized to perform the work of operating other mechanisms.

The upper end of lever 72 is also connected, as by a pivoted link 75, to a crank disk 78, as at 76, the crank disk 78 being fixed on a rotatable shaft 80 adapted to be clutched to and declutched from the motor 82 (Figure 2). The shaft is suitably supported, as from the frame member 18, by downwardly depending brackets 84 and is clutched, as by a slip clutch 86, to the worm wheel 87 driven from a worm 88 on the shaft of motor 82. Keyed to the shaft and in fact a part of one of the clutch members 86, is a collar 89 provided on its periphery with a plurality of axially extending slots 90 adapted to be selectively engaged by a knife-like end 91 of a lever 92 pivoted as at 93 on the frame member 84. The forward end 94 of the lever 92 is connected, as by a link 95, with an outwardly extending arm 96 carried on a collar 97 freely rotatable on the shaft 80. This collar 97 also has an upwardly extending arm 98 which carries a downwardly extending portion 100 disposed in the vertical plane of the crank disk 78. On the crank disk 78 is a lug 102 having a cam surface 103 adapted to be engaged by a corresponding cam surface 104 on the end of plunger rod 105 supported for reciprocation in the structure 98, 100 and normally urged downwardly by a spring 101. The upper end of the rod carries a tooth 106 adapted to ride over a curvilinear surface 107, and, at a certain point in its movement, enter a slot 108. The carrier frame member 100 is pivotally connected, as by a link 110, with the armature 111 of an electromagnet 112.

Figure 8:
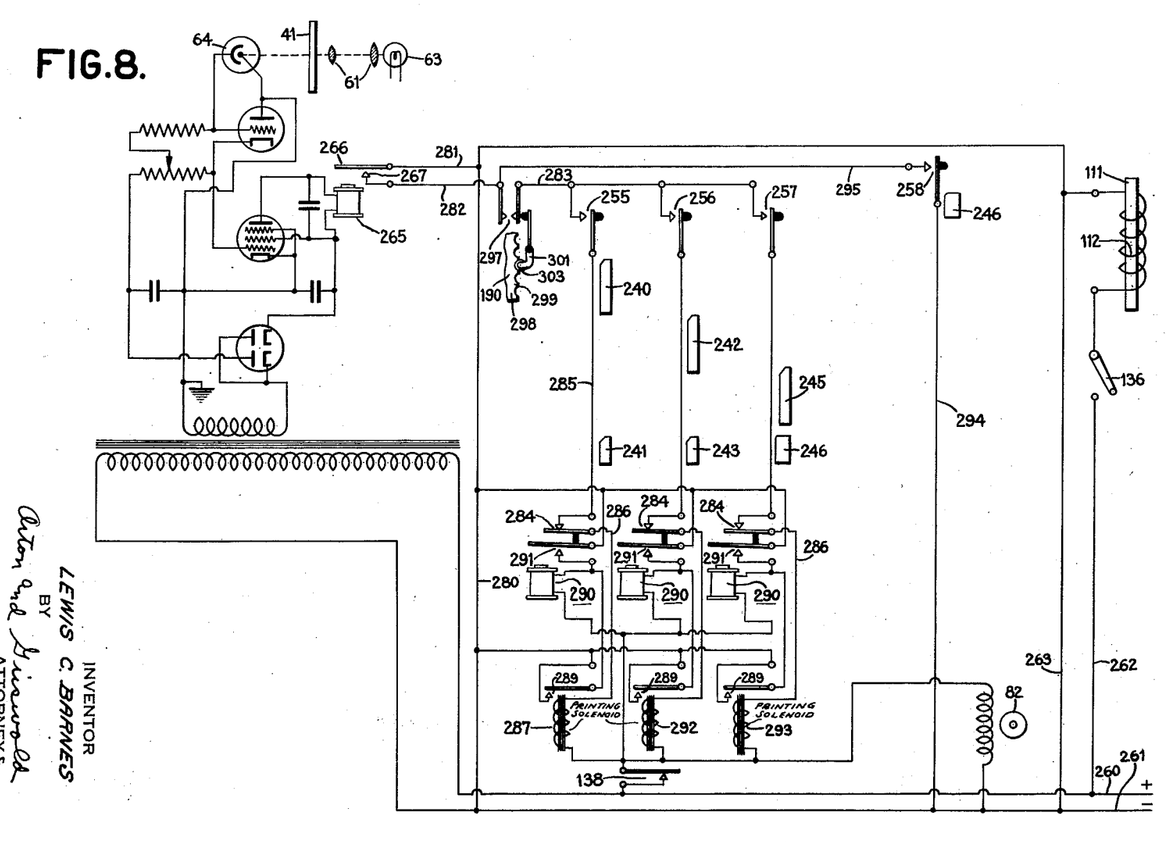
Figure 8 is a wiring diagram.

When a load is on the weighing scale and the scale beam comes to rest, the operator closes the switch 136, Figure 8, thereby completing the circuit through the electromagnet 112 and thereby drawing the armature 111 inwardly or to the left, as viewed in Figure 1.

Movement of the armature 111 draws the link 110 to the left, as viewed, until the detent 106 enters the locking recess 108 in the curvilinear surface 107, the detent 106 entering the recess under the influence of the coil spring 101 acting on the rod 105 in a downward direction. At this time, the cam surface 104 of the rod 105 is free of the lug 102 on the crank disk 78 so that the rod 105 is permitted to move downwardly to permit the latching movement of the lug into the recess 108. During such movements the shaft 80 is locked in position by the restraining member 91 engaging a groove in the toothed collar 90.

Movement of the arm 100 and plunger rod 105 in a counter-clockwise direction, as viewed in Figure 1, brings with it the collar 97, to which it is attached, and this movement of the collar 97 depresses the end 94 of locking lever 92, thereby releasing the clutch 90, 91. The toothed collar being now released, the shaft 80 and its associated clutch mechanism is free to move when driven by the motor 82. The end 91 of the latching lever 92, when raised, also serves as a switch actuating member closing a switch 138 which energizes the motor 82 from the main supply line. The motor drives the shaft 80 in a clockwise direction, as viewed in Figure 1, through the worm 88 and worm wheel 87 and friction clutch 86 thereby rotating the crank disk 78 also in a clockwise direction, and, through link 75, moving the lever 72 to the right, as viewed, and also through the link 70, commencing the traverse of the carriage 58 along the rods 54, 55, and across the weight indicating chart 41 which is illustrated as a sector-shaped member having relatively substantially light transmitting areas and opaque areas arranged in predetermined relation corresponding to the loads on the weighing scale.

So much of the weighing scale described hereinbefore is shown, described and claimed in the copending application of Barnes and Holt, Serial Number 183,630, filed January 6, 1938.

The mechanism actuated by movement of carriage 58 may take the form of a shaft 184 journalled in any convenient manner, as in brackets depending from the supporting frame 18. Fixed on the shaft is a depending arm 186 and also a gear sector 185 in mesh with a rack 187 moving in a guide 188. One end of the rack 187 is connected to the lever arm 72. When, therefore, the lever arm 72 is moved in a clockwise direction, as viewed, to advance the carriage 58 along the rods 54, 55, the rack 187 is advanced in the same direction rotating the gear 185 and swinging, in this instance, the arm 186, fixed on shaft 184 and supporting a type carrier member 190, in a counter-clockwise direction about the shaft 184, and again as the carriage moves in the opposite direction, the arm 186 is swung in a clockwise direction back to initial position.

The type carrier member 190 is conveniently so shaped that any point on its face thereof will travel in the curved plane defining the lower surface thereof. It moves above a platen 191 parallel to a plane tangent thereto across which passes the strip 192 or the like to be printed in any well known manner.

It will be understood that the length of the link 70 and lever 72 or the gear ratio between the rack 187 and the gear 185 are such that the gear segment is swung in a clockwise direction proportional with the travel of the carriage 58 along the rods 54, 55 so that as the light responsive device crosses light transmitting areas on the chart 41, the beam of light will pass through a particular light transmitting area and on to the photoelectric cell to energize a circuit and effect the printing of a number corresponding to the number represented by the light passage on the chart.

Figures 9, 10:
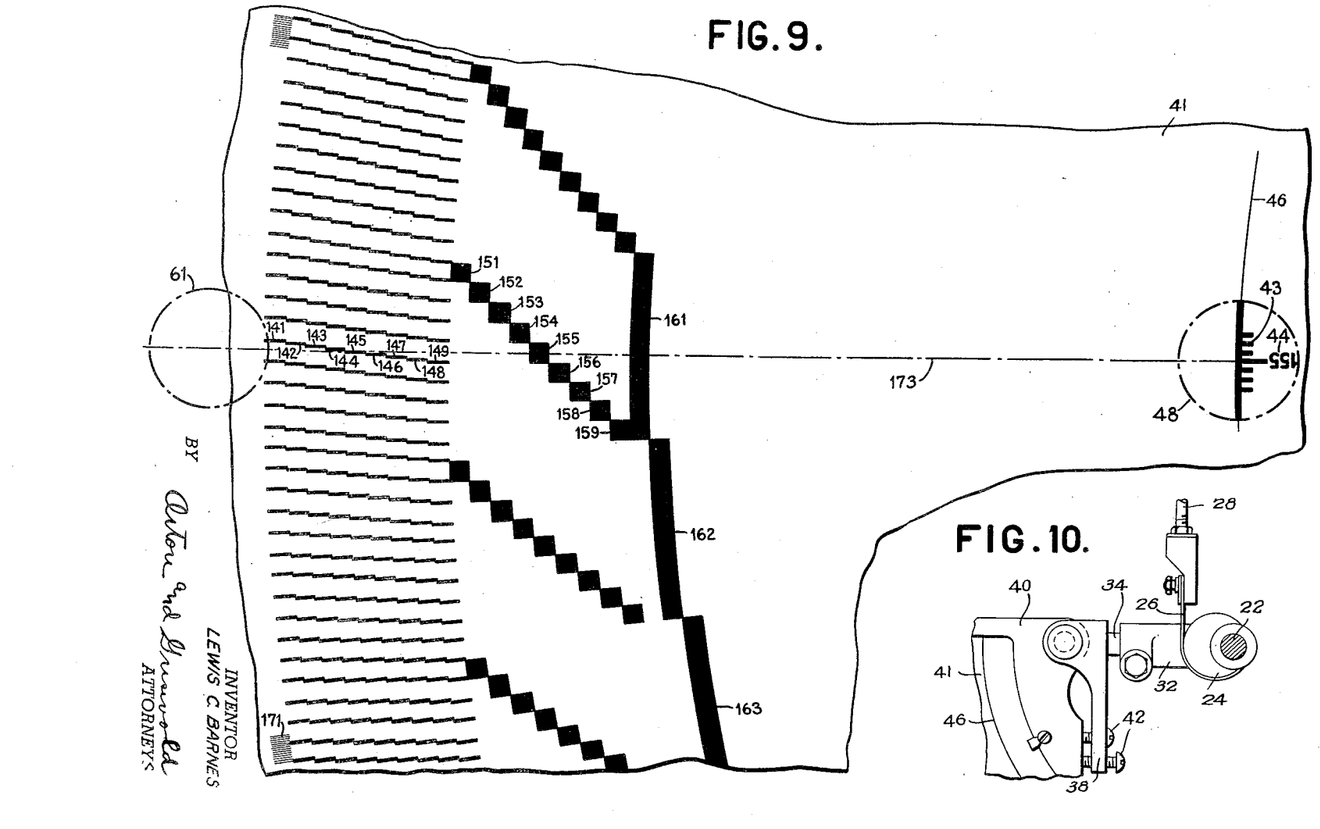
Figure 9 shows a chart.
Figure 10 is a view showing the chart frame mounting and adjusting means which are obscured in Figure 1 by other parts of the scale mechanism.

Conveniently, along one side, as shown magnified at one point in Figure 9, within the circle shown by the broken line representing lens 48, is an arcuate scale 46, the subdivisions or graduations 43 of which represent units of weight with which are associated the numerical indications 44 of the weight represented by the respective graduations. Near the left hand periphery of the chart, as viewed, are a plurality of series of light transmitting areas representing, for instance, units of weight. One such series of units is indicated on the chart as 141, 142, 143, 144, 145, 146, 147, 148 and 149. Each unit light transmitting area represents a unit of weight, for instance, pounds, and corresponds to a graduation 43 on the scale 46. It is of a width in a circumferential direction, defined by radial lines defining a unit subdivision on the scale 46. It will be noted that each light transmitting area, say 145, is displaced or in echelon with respect to the adjacent subdivision, say 146, and is defined by the radial lines defining the adjacent unit subdivision on the scale 46. Thus, there are nine such light transmitting areas 148, 149, etc., corresponding to the nine subdivisions of the scale 46 say from zero to ten or from fifty to sixty, a light ray passing through such subdivision, say 145, represents the numeral 5 in the weight 155 pounds in the illustrated example. Obviously, there is one of these series 141—149 for each of the "tens," that is, one series between one and ten, a second series between ten and twenty and so on. There are also a plurality of series of light transmitting areas 151, 152, 153, 154, 155, 156, 157, 158 and 159 representing the numerals in the tens column. In the illustrated embodiment that numeral is 5. The second light transmitting area 152 represents the numeral 2 in the tens column of the weight and so on, as before, for nine successive light transmitting areas. The next elongated light transmitting area 161 represents the first numeral in the hundreds column of the weight, as before, and the adjacent light transmitting area 162 represents the numeral 2, etc. There would, of course, be nine successive areas 161–9 to represent the hundreds from 100 to 900 in the hundreds column representing the weight. It will be noted that another series of light transmitting areas may be shown on the chart and represent the numeral 1 in the next adjacent or fourth column, i. e., the thousands column, and so on depending upon the capacity of the scale. On the extreme left, is a row of graduations 171 representing, on the chart of Figure 9, one-half pound graduations. These are represented in the same way and cover an area representing one-half of a successive unit light transmitting area, i. e., there would be two light transmitting areas 171 for each unit light transmitting area 141, etc. To recapitulate, a broken line 173 has been drawn radially through the one hundred fifty-five pound graduation of scale 46. It passes through areas 161 (one hundred), 155 (fifty) and 145 (five) giving the reading one hundred and fifty-five pounds in this instance.

In the present instance, a type carrying plunger, such as 205, on the member 190 bearing the corresponding numeral will be moved to operative position beneath the hammer, such as 233. Looking down on the member 190, Figure 6, it will be observed that the member is formed with three series of passages 234, indicated in dotted lines in Figure 7, nine in each series and each series lying in a plane spaced from the parallel plane of the next adjacent series. The plungers in each series of passages are numbered from one to nine, respectively. The plungers of the first mentioned series are indicated by the reference characters 201—209. The plungers of the next series are indicated by the reference characters 211–219. The plungers of the third series are numbered 221 to 229. Each series of plungers is adapted to print the numbers 1 to 9, respectively. The three series are arranged in echelon so as to permit the printing of the successive numbers in one continuous movement of the printing head 190. It is found convenient to utilize one printing hammer for the type members in each parallel row, the three printing hammers 233, 237, 238 being actuated by the respective electromagnets 287, 292, 293 (Figure 7). In operation, therefore, when the light responsive device comes opposite, say, the opening representing five pounds weight on the scale in the first circumferential row, the arm 186 will be swung toward the right to bring, say, the fifth type carrying plunger 205 in the first row under the hammer 233. The hammer 233 is immediately caused to strike the head 235 (Figure 7) causing the type to be depressed to print the numeral 5 as the digit of the amount weighed on the receiving strip 192. It is to be understood that the immediately following description disregards the circuit closer 297 of Figure 8 both because this circuit may, in some situations, be omitted and also because this circuit closer is closed when printing takes place, as described hereinafter. Any convenient feeding mechanism for the strip may be used. After printing the first digit, the type carrier 190 continues to move in a counter-clockwise direction until a predetermined plunger in the second row, say, plunger 215, is beneath the hammer 237 to print the numeral, say 5, in the tens column on the strip, as the carriage 58, in its advance, comes opposite the light passage representing the numeral, say 5, in the tens column of the weight recorded by the weighing scale. Again the carriage advances and the light ray passes through, say, the light passage representing a hundred in the weight one hundred fifty-five pounds. The arm 186 again rotates with the carriage and brings, say, the plunger 221 in the third row beneath hammer 238. The circuit is energized and the hammer 238 is caused to strike the plunger 221 printing the figure one in the hundred column on the strip. The numeral in any one of the columns might be zero. The hammer 233, 237 or 238 will not then strike until the type carrying member rotates to bring the zero plunger 210, 220 or 230 beneath the hammer. It will be observed that the three rows of type plungers are disposed in echelon.

Carried along one side of the type carrying member 190 is a plurality of cam surfaces or raised portions, each pair of which is arranged in a plane parallel to the plane of movement of the member 190. Proximate the member 190 and near its right hand end, as viewed, is a raised portion or cam member 240 of a length substantially equal or at least proportional to the distance occupied by the first nine type plungers 201–209. At the extreme left hand end, as viewed, in this same plane is another raised portion or cam surface 241. Adjacent to this pair of cam surfaces and in a plane parallel thereto is a second cam surface 242 corresponding in position and proportional or equal in length to the second series of type plungers 211–219 corresponding to the type which print the second column of figures. Again in the same plane and adjacent the raised portion 241 is another raised portion 243. Adjacent the pair of raised portions 243 and 241 is a third pair of raised portions 245 and 246 lying in a plane parallel to the planes before mentioned, the raised portion 245 corresponding to the extent of the column of type plungers 221–229 disposed in the third row and adapted to print the numbers in the third column. The raised portion 246 is of greater elevation than the raised portions 241 and 243 with which it is parallel and corresponds to the type plunger 230.

Carried upon a supporting frame 252 are a plurality of plungers 249, 250 and 251 slidable and guided in ways formed therein. These plungers are arranged in the planes of the pairs of raised portions, respectively, one plunger lying in each of the three aforesaid parallel planes. The plungers are provided at their lowermost ends with rollers 253 adapted to travel on the raised portions. Disposed above the respective plungers so as to be closed thereby when they are elevated, are a leaf spring contact switch 255 which is adapted to be closed when the plunger 249 is raised by the cam surface 240, a contact 256 adapted to be closed by the plunger 250 when this plunger is raised by the cam surface 242 and a contact 257 adapted to be closed by the plunger 251 when raised by the cam surface 245. The contacts 255 and 256 are obviously also closed when the cams 241 and 243 are brought beneath the plungers 249 and 250, respectively. Immediately above the contact 257 is a contact 258 which is adapted to be closed by the plunger 251 at the same time as the contact 257 is closed when the plunger 251 travels over the higher cam member 246.

Referring now to the wiring diagram, Figure 8, after the weighing scale is balanced, the operator closes the circuit by closing the switch 136 completing a circuit between a source of supply 260, 261 through leads 262, 263 and the electromagnet 112 causing the armature 111 thereof to move the rod 105 to the latching position in engagement with the notch 108, as previously described, and during the cycle of operations causing the closing of the switch 138 when the shaft retarding member 91 is raised. As before explained, this contact 138 closes the circuit through motor 82 which in turn rotates the shaft 80 and the crank disk 78 to cause the carriage 58 to carry the source of light 63 and light responsive device 64 across the chart. Let it be assumed that the chart is in a position resulting from the weighing of one hundred fifty-five pounds. The light ray from the element 63 will be projected through the transparent portion representing the fifth unit space of the apertures representing the first column of figures from 1 to 9. This has also swung riser 240 to the point where it elevates plunger 249. This light ray, having passed through the aperture, falls upon the photoelectric cell 64 energizing a relay 265 and closing the contacts 266, 267 and completing the circuit from the source 260, 261 to the spring contacts 255 through leads 280, 281, 282, 283. The contacts 255 are closed because the riser 240 has raised the plunger 249 to close them. The contacts 297 are closed, as hereinafter described, by the teeth 299, Figure 6, on the printing head. The current flows from the contacts 255, it being assumed that leads 282, 283 are electrically connected through lead 285, normally closed contacts 284, and lead 286 to energize the solenoid 287 of the unit printing hammer 233 and causes it to strike the fifth plunger 205 in the first series or unit series of type carrying plungers, causing a printing of the numeral five on the card. Substantial movement of the armature of the solenoid 287 results in closing the contacts 289 to complete a circuit including a solenoid 290 of a holding relay 291 which closes the holding switch 291 and opens the contacts 284 which move in unison therewith. The circuit through the units printing hammer solenoid 287 is thus opened. It will be apparent that solenoid 287 cannot be again energized during the same printing cycle by the closing of contacts 266, 267 of the aperture relay. The source of light 63 and light responsive device 64 on the carriage 58 continues to travel while this operation occurs, which occurs substantially instantaneously, and the beam of light travels across the space on the chart 46 occupied by the apertures from which the numerals in the second column of the indication are printed. Assume, as an example, however, that the number 105 is to be printed. No numeral is to be printed in the second column since the figure in the second column is a zero and it will be obvious that the path of the light beam does not strike any one of the apertures of the "tens" series. Thus no light is transmitted through the chart and the photoelectric cell is not energized and hence the aperture relay 266, 267 is not closed. Hence the closing of the contacts 256 by the cam surface 242 does not complete a circuit and does not energize, at that time, the printing solenoid 292 adapted to actuate the "tens" hammer 237 operating on the row of type plungers 211–219 in the second series. The light responsive device, of course, is continuing its travel across the chart and the light beam passes through the aperture representing the one hundred light transmitting portion to effect printing of one in the number one hundred five. The light ray thus passes through this light transmitting portion and again falls on the photoelectric cell 64 energizing the aperture relay 265 to complete the circuit through the third printing hammer solenoid 293, the circuit through this solenoid 293 being completed by reason of the fact that the contacts 257 are also closed by the plunger 251 when it is elevated by the third cam surface 245, thus effecting the printing of the numeral one in the third column. As before, contacts 291 are closed by the energization of the solenoid 290 in the circuit of the holding relay 290 of the holding circuit of solenoid 293 which results in opening the contacts 284 in the circuit including the contacts 257, thus deenergizing solenoid 293 and reopening the circuit and assuring that no figure can be again printed in this column until the next printing cycle. In this connection, it is to be noted that the elements of the holding circuits of the respective printing solenoids have been given like reference characters.

The cam surfaces 241, 243 and 246 now move beneath the plungers 249, 250 and 251 elevating all three plungers and again closing their contacts 255, 256, 257. The plunger 251 also closes the contacts 258 immediately thereabove which completes a circuit from the source including leads 294, 295, 283 in lieu of the closing of the circuit by the operation of the aperture relay 265, the contact 256 being at this time closed by the cam surface 243, the circuit being completed through the normally closed contacts 284 and printing solenoid 292 operating the hammer striking the zero type carrying plunger 220 in the second series of numbers to print the numeral zero of the weight indication one hundred five.

As before the operation of the solenoid 292 closes the contacts 289 which energizes the relay solenoid 290 to close the holding circuit contacts 291 and all of the holding circuit of printing solenoid 292, the contacts 284 being simultaneously opened to deenergize the solenoid 292, permitting the type hammer to return to its original position.

The carrier 58 having completed its stroke corresponding to dead center position of the crank 75, the carrier commences its return movement. At, or just prior to, its return to initial position, the lug 102 on the crank disk 78 strikes the rod 105 raising the tooth 106 out of the recess 108 and thereby moving the lower end of the rod 105 with sufficient force to cause it to move back to its initial position through the instrumentality of the force of the spring and the coacting cam surfaces 103 and 104. This rotating movement also permits the release of the cooperating clutch members 90, 91 through link 95 during the return movement of carriage 58 so that the worm wheel 87 is freely rotatable with respect to the shaft 80 and the shaft 80 and its associated parts are not affected by the further rotation of the motor 82 in coming to a stop. Movement of the arm 100 carries the collar 97 about the shaft 80 and causes the lever 92 to rock to cause the engagement of the knife edge 91 with one of the grooves 90 in the collar 89. This occurs substantially instantaneously so that the crank disk 78 is stopped in its movement promptly. Movement of the arm 91 into braking position with respect to the drum 89 moves the end 91 away from the spring contacts 138, permitting these contacts to open and to interrupt the circuit through the motor 82 whereby the motor 82 is deenergized. Interrupting the circuits through the contacts 138 also interrupts the circuit through the holding circuit relays 290, which thereby permit the contacts 284 to be again closed preparatory to the next printing cycle. Also the return of the type holding member 190 to original position coincident with the return of the carriage 58 to its original position results in the opening of all of the contacts 255, 256 and 257.

Figure 5:
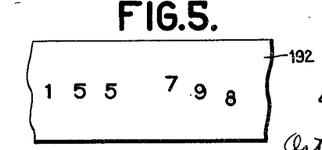
Figure 5 is a fragmentary plan view of a ticket printed by the mechanism of this invention.

The photoelectric cell 64 is desirably adapted to be energized if fifty percent of the light beam from light source 63 falls upon it. If, therefore, the beam of light which is equal in shape and area to an aperture in the chart, passes exactly across the aperture, it will be obvious that the photoelectric cell is energized when the first half of the light beam passes through the aperture and continues to be energized until the last half of the light beam is all that passes through the aperture. It is desirable, therefore, to have the hammer 233, 237 or 238 strike the type bar at that position which will keep the type in line and prevent one type, for instance, being printed ahead of time so that it is, say, above the line as shown by the numeral seven in Figure 5, or a type bar actuated late so that the numeral eight is printed below the line. It is proposed, therefore, to control the type printing circuit so that it is completed only at the proper time to keep the printed figures in line. For this purpose, a pair of normally open leaf spring contacts 297 are included in the lead 282 from the aperture relay 266, 267 to the plunger actuated contacts 255, 256 and 257. Therefore, irrespective of how long the aperture relay is energized, it is only when contacts 297 are closed that the printing takes place.

Figure 3:
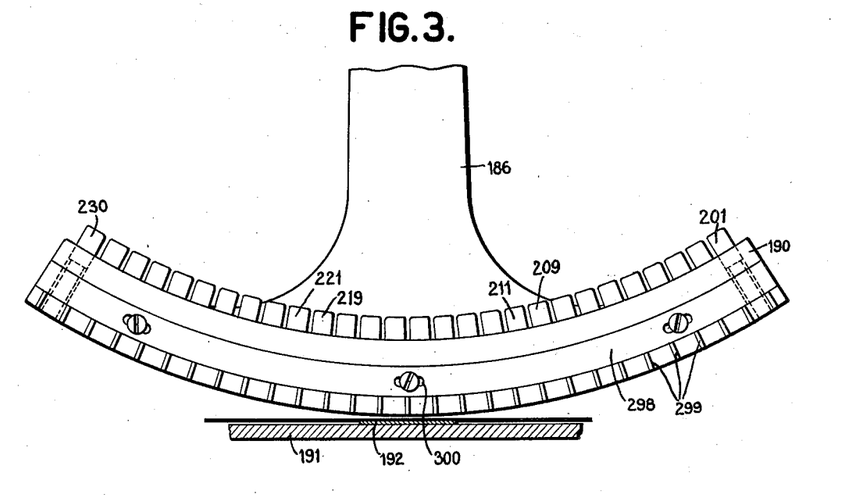
Figure 3 is a view in side elevation showing the printing head of this invention looking from the side opposite to that shown in Figure 1 and, in fact, taken in the plane indicated by the line 3—3 of Figure 6 looking in the direction of the arrows.
Figure 4:
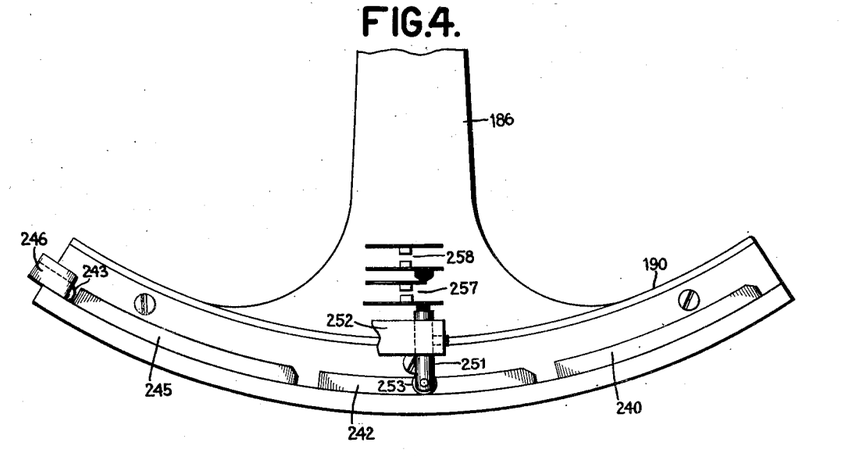
Figure 4 is a view showing the printing head taken on the line 4—4 of Figure 6 looking in the direction of the arrows, similar to Figure 3.
Figure 6:
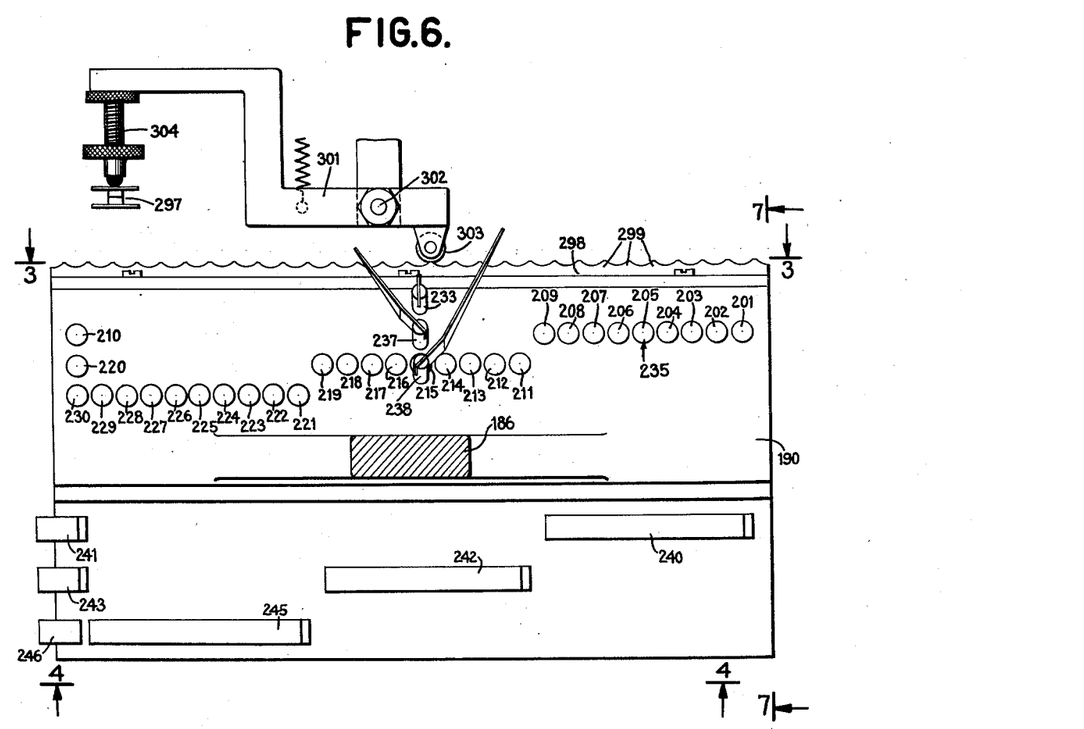
Figure 6 is a plan view partly in section of the printing head and its associated striking hammers.
Figure 7:
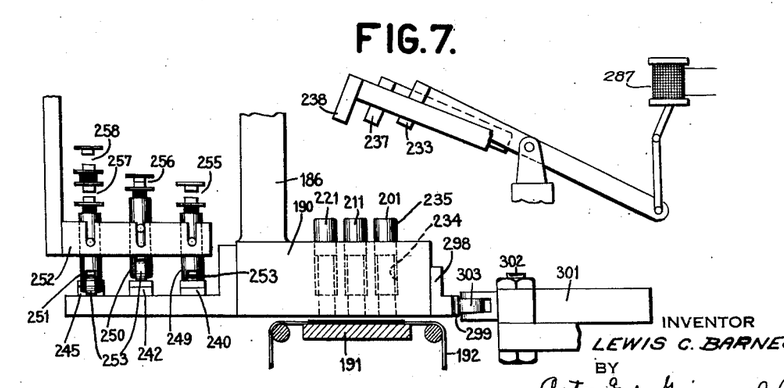
Figure 7 is an end view of the printing head looking from the right as if taken on the line 7—7 of Figure 6 but also including structure shown in side elevation in Figure 4.

Referring now to Figures 6 and 7, it will be noticed that a supplemental member 298 is carried on one side of the type carrying member 190, which supplemental member 298 is provided with a plurality of laterally extending teeth 299, each tooth corresponding in position to a type carrying plunger. This tooth carrying supplemental member is adjustable as by pin and slot connections 300 (Figure 3) so that the teeth may be brought exactly in proper relation to the corresponding plungers.

Pivotally mounted adjacent the supplemental member 298 is a contact actuating lever 301 pivoted as at 302. One end of lever 301 carries a roller 303 and the other end of the lever carries an adjustable switch actuator 304 adapted to actuate the contacts 297. When, therefore, the roller 303 rides up on a tooth 299, the lever 301 is rocked about its pivot 302 and the contacts 297 are closed and current may flow through from the aperture relay 265—267 to the leaf spring contacts 255, 256 or 257, as the case may be. When the type carrying plunger is not exactly in proper position, the space between the teeth 298 is opposite the roller 303 and since the roller 303 is normally urged toward the supplemental member 298, it will lie in the space between the teeth 298 and thus the contacts 297 are open and no current can flow to the striking mechanism. However, as soon as contacts 297 close, the circuit is completed through the closed contacts 255 or 256 or 257, as the case may be, and the operation of the appropriate printing hammer solenoid 287 or 292 or 293 is effected.

It will thus be seen that printing mechanism is provided which, while controlled by the load upon the scale, is actuated from a source of power independent of the movement of the scale mechanism and, in fact, no part of the printing mechanism is operatively connected with the scale mechanism thereby freeing the scale mechanism of all strain which would deleteriously affect its accuracy. The printing of an indication of the load, in accordance with this invention, is effected during a continuous movement of a printing head in the same direction of movement, for instance, rotation about an axis. Moreover, devices are provided whereby the printing of the indicia representing the load on the weighing scale in a straight line is assured.

Various modifications will occur to those skilled in the art in the form taken by the instrumentalities going to make up the invention as a whole, as well as in mechanical movements which will effect the same result as those shown herein. Therefore, no limitation is intended by the phraseology of the foregoing description or illustrations in the accompanying drawings except as indicated in the appended claims.

What is claimed is:

1. In printing mechanism for weighing scales, the combination with weight indicia movable proportionally to the load on the scale, of movable scanning means for said weight indicia, a movable type carrier, type carried by the type carrier adapted to print indications of the weight equal to the weight indicated by the weight indicia, means connecting said scanning means and said type carrier whereby said scanning means and carrier move in unison and means controlled by the scanning means to actuate said type.

2. In printing mechanism for weighing scales, in combination, weight indicia movable proportionally to the load on the scale, a scanning device responsive to the weight indicia, means to move said scanning device through a cycle of movement; printing means, means to effect printing, means to move said printing means through a cycle of movement and operative connections between said scanning device and said printing means whereby said scanning device and the printing means move in unison and the scanning device determines the portion of the cycle in which the printing means is actuated.

3. In printing mechanism for weighing scales, in combination, weight indicia movable proportionally to the load on the scale, a scanning device responsive to the weight indicia, a printing head, means linking the printing head and the scanning device to move proportionally to one another, printing hammers, cams carried with the printing head, and means controlled by the respective cams to actuate the respective printing hammers.

4. In printing mechanism for weighing scales, in combination, weight indicia movable proportionally to the load on the scale, a scanning device responsive to the weight indicia, a printing head, means linking the printing head and the scanning device to move proportionally to one another, printing hammers, cams carried with the printing head, means controlled by the respective cams to actuate the respective printing hammers and means to prevent reactuation of a printing hammer in the same printing cycle.

5. In printing mechanism for weighing scales, in combination, weight indicia movable proportionally to the load on the scale, a scanning device responsive to the weight indicia, a printing head, means linking the printing head and the scanning device to move proportionally to one another, printing hammers, cam means carried with the printing head, means controlled by the respective cam means to actuate the respective printing hammers, and means carried by the printing head to effect actuation of the printing hammers when in exact printing position.

6. In printing mechanism for weighing scales, in combination, weight indicia movable proportionally to the load on the scale, a scanning device responsive to the weight indicia, a printing head having movement of rotation, means linking the printing head and the scanning device to move proportionally to one another, printing hammers, control means carried with the printing head, and means controlled by said control means to actuate the respective printing hammers.

7. In printing mechanism for weighing scales, in combination, weight indicia movable proportionally to the load on the scale, a scanning device responsive to the weight indicia, a printing head, means linking the printing head and the scanning device to move proportionally to one another, a plurality of rows of printing type carried by the printing head, each row of type comprising numerals from one to nine, said rows being arranged in echelon, a series of zero type corresponding in number to and respectively in line with said rows and disposed transversely of said first named rows, a printing hammer for each row of type, cam means carried with the printing head, and means controlled by the respective cam means to actuate the respective printing hammers.

8. In printing mechanism for weighing scales, in combination, weight indicia movable proportionally to the load on the scale, a scanning device responsive to the weight indicia, a printing head, means linking the printing head and the scanning device to move proportionally to one another, a plurality of rows of printing type carried by the printing head, each row of type comprising numerals from one to nine, said rows being arranged in echelon, a series of zero type corresponding in number to and respectively in line with said rows and disposed transversely of said first named rows, a printing hammer for each row of type, a plurality of cam means carried with the printing head, means controlled by the respective cam means to actuate a printing hammer, said cams corresponding in relative position to the relative position of said rows of type and of the series of zero type to determine the instant of actuation of the printing hammers.

9. In printing mechanism for weighing scales, in combination, weight indicia movable proportionally to the load on the scale, a scanning device responsive to the weight indicia, a printing head, means linking the printing head and the scanning device to move proportionally to one another, a plurality of rows of printing type carried by the printing head, each row of type comprising numerals from one to nine, said rows being arranged in echelon, a series of zero type corresponding in number to and respectively in line with said rows and disposed transversely of said first named rows, a printing hammer for each row of type, a plurality of cam means carried with the printing head, means controlled by the respective cam means to actuate a printing hammer, said cams corresponding in relative position to the relative position of said rows of type and of the series of zero type to determine the instant of actuation of the printing hammers, the cam corresponding to the zero type in line with the row of type last to be actuated being higher than the others and means actuated thereby to actuate a zero type.

10. In printing mechanism for weighing scales, in combination, weight indicia movable proportionally to the load on the scale, a scanning device responsive to the weight indicia, a printing head, means linking the printing head and the scanning device to move proportionally to one another, a plurality of rows of printing type carried by the printing head, a series of zero type corresponding in number to said rows and respectively in prolongation thereof, printing means for the respective rows, and means carried with the printing head to effect actuation of a printing means.

11. In printing mechanism for weighing scales, the combination with weight indicia movable proportionally to the load on the scale, of a scanning device comprising first circuit closing means responsive to said weight indicia; a printing head having movement of rotation; means linking the printing head and the scanning device to move proportionally to one another; printing hammers; a first circuit comprising a manually actuated circuit closer and an electromagnet adapted to render inoperative said linking means; a second circuit comprising a circuit closer closed upon energization of the electromagnet of the first circuit; a third circuit comprising the first circuit closing means and a holding relay having normally open contacts; a fourth circuit comprising said normally open contacts of the third circuit and a plurality of circuits; each of said plurality of circuits of the fourth circuit comprising a cam actuated circuit closer, a normally closed circuit closer, a solenoid actuating a printing hammer, and a holding circuit; said holding circuits each comprising a circuit closer closed upon energization of the printing hammer actuating solenoid of the third circuit and a holding relay to open the normally closed circuit closer of the fourth circuit and thereby render the fourth circuit inoperative, said fourth circuit also comprising a circuit closer adapted to be closed by the printing head when in exact printing position whereby said fourth circuit may be energized.

12. In printing mechanism for weighing scales, the combination with weight indicia movable proportionally to the load on the scale, of a scanning device comprising first circuit closing means responsive to said weight indicia; a printing head having movement of rotation; means linking the printing head and the scanning device to move proportionally to one another; printing hammers; a first circuit comprising a manually actuated circuit closer and an electromagnet adapted to render inoperative said linking means; a second circuit comprising a circuit closer closed upon energization of the electromagnet of the first circuit; a third circuit comprising the first circuit closing means and a holding relay having normally open contacts; a fourth circuit comprising said normally open contacts of the third circuit and a plurality of circuits; each of said plurality of circuits of the fourth circuit comprising a cam actuated circuit closer, a normally closed circuit closer, a solenoid actuating a printing hammer, and a holding circuit; said holding circuits each comprising a circuit closer closed upon energization of the printing hammer actuating solenoid of the third circuit and a holding relay to open the normally closed circuit closer of the fourth circuit and thereby render the fourth circuit inoperative.

13. In a weighing scale, the combination with weight indicating means the movement of which is proportional to the load on the scale, and scanning means therefor, of a printing head; means linking the printing head and the scanning means for proportional movement; said printing head being moved in one direction to printing position and moved in the opposite direction in its return to initial position, a plurality of rows of type plungers reciprocable in the printing head, each row of plungers bearing numerals from one to nine, said rows being arranged in echelon, a series of zero type plungers transversely of said rows, a printing hammer for each row, electrical circuits corresponding in number to the rows of plungers and each comprising a printing hammer solenoid and a circuit closer; a plurality of cams carried with the printing head, said cams corresponding in relative position to the said rows of plungers, said circuit closers being closed, respectively, by the cams to complete the circuits and effect energization of the solenoid in the completed circuit and thereby actuate the corresponding printing hammer.

14. In printing mechanism for weighing scales, the combination with weight indicating means the movement of which is proportional to the load on the scale and scanning means comprising light responsive circuit closing means adapted to travel with respect to the weight indicating means, a rotatable shaft, an arcuate printing head rotated by the shaft in one direction to print an indication of the weight and rotatable in the opposite direction in its return to initial position; shaft releasing means; a circuit comprising a manually actuated circuit closer and an electromagnet adapted to actuate the shaft releasing means, a second circuit comprising a circuit closer closed by the shaft releasing means in shaft released position, operative connections between the rotatable shaft and the printing head comprising clutch means; a third circuit comprising the light responsive circuit closing means, and a relay, a plurality of rows of type plungers reciprocable in the printing head and arranged in echelon; a row of zero type plungers, printing hammers for the type plungers, respectively, a plunger being in line with each row and adapted to be respectively actuated by the printing hammer of the row of which said zero type plunger is in prolongation, a solenoid actuating each printing hammer; a plurality of cams carried with the printing head, said cams corresponding in relative position to the plungers, the cam corresponding in relative position to the zero type plunger in the last row of plungers being higher than the others, a series of plungers one for each row of cams and arranged transversely thereabove; a fourth circuit comprising said normally open contacts of the relay of the third circuit and a plurality of circuits each of which comprises a circuit closer actuated by said plungers when elevated by a cam, a normally closed circuit closer controlled by a holding relay and a solenoid operating a printing hammer; each of said circuits also comprising a holding circuit comprising a circuit closer closed upon energization of a printing hammer solenoid and a holding relay of the aforesaid relay controlled circuit closer of the third circuit and a cam controlled circuit closer common to said plurality of circuits of the fourth circuit.

15. In a weighing scale, the combination with weight indicating means the movement of which is proportional to the load on the scale and scanning means comprising light responsive circuit closing means adapted to travel with respect to the weight indicating means, a rotatable shaft; shaft releasing means; a circuit comprising a manually actuated circuit closer and an electromagnet adapted to actuate the shaft releasing means; a second circuit comprising a circuit closer actuated by the shaft releasing means in shaft released position; a rotatable printing shaft, driving connections between the rotatable shaft and the printing shaft comprising a rack and pinion; clutch means between the first named shaft and the driving connections; an arcuate printing head on the printing shaft rotated by the shaft in one direction to print an indication of the weight and rotatable in the opposite direction in its return to initial position; a third circuit comprising the light responsive circuit closing means and a relay having contacts; a plurality of rows of type on the printing head, each row of type bearing numerals from one to nine, respectively, said rows being arranged in echelon, a row of zero type transversely of said first named rows, a printing hammer for each row of type; a solenoid actuating each printing hammer; a plurality of cams carried with the printing head, said cams corresponding in relative position to the said rows of type; a series of contacts one for each row of cams; a fourth circuit comprising said contacts of the relay of the third circuit and a plurality of circuits each of which comprises a circuit closer actuated by said cams, a normally closed circuit closer controlled by a holding relay and a solenoid operating a printing hammer; each of said circuits also comprising a holding circuit comprising a circuit closer closed upon energization of a printing hammer solenoid, a holding relay of the aforesaid relay controlled circuit closer of the third circuit and a cam controlled circuit closer common to said plurality of circuits of the fourth circuit.

LEWIS C. BARNES.